(Model.)

T. W. SQUIRES.
DUST CAP FOR AXLES.

No. 258,492.   Patented May 23, 1882.

WITNESSES
W. B. Mcasson
L. A. Marcerou

INVENTOR
Thomas W. Squires
by Duell, Laass & Hey
ATTORNEYS.

UNITED STATES PATENT OFFICE.

THOMAS W. SQUIRES, OF SENECA FALLS, NEW YORK.

DUST-CAP FOR AXLES.

SPECIFICATION forming part of Letters Patent No. 258,492, dated May 23, 1882.

Application filed January 18, 1882. (Model.)

*To all whom it may concern:*

Be it known that I, THOMAS W. SQUIRES, of Seneca Falls, in the county of Seneca and State of New York, have invented new and useful Improvements in Dust-Caps for Journals, of which the following, taken in connection with the accompanying drawings, is a full, clear, and exact description.

The nature of this invention consists in a novel construction and combination of a metal nut or cap adapted to be secured to the end of a journal-box or axle-box, and provided externally with a flange and with pins or lugs, and an envelope of rubber or other suitable material embracing closely the exterior of said nut and having a projection at the base of the same, said projection coming first in contact with the end of the journal-box or axle-box when the cap is applied thereto, and thereby forming an air-tight packing between the metal nut and journal-box and effectually excluding the dust therefrom, and also forming a nut-lock to prevent the nut from working loose, and at the same time preventing the nut from becoming bound or set, and thus allowing the same to be removed without the aid of a wrench, when required, for oiling the journal or for repairs. The flange and lugs projecting from the exterior of the metal nut into the rubber envelopes prevent the latter from becoming detached.

Figure 1:
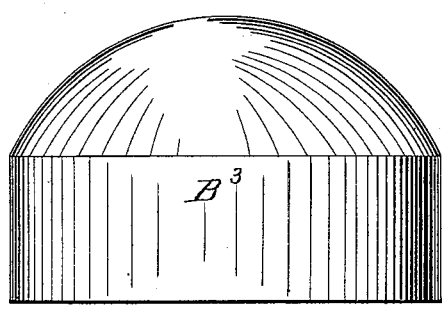
Figure 2:
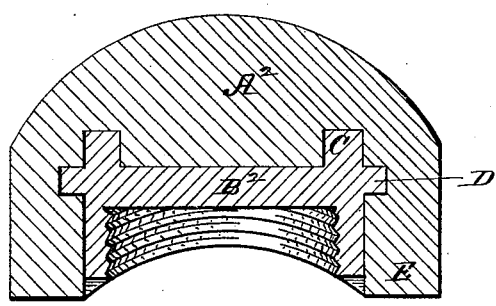
Figure 3:
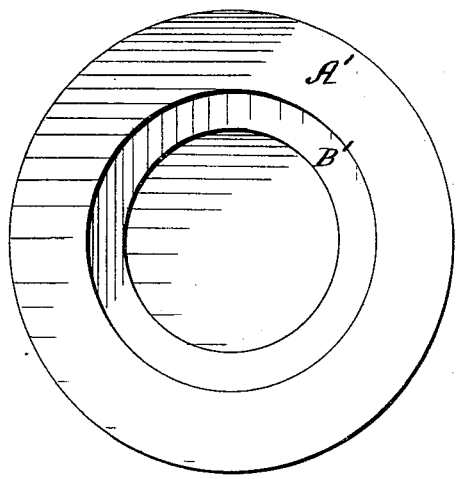

The invention is fully illustrated in the annexed drawings, wherein Figure 1 is a perspective view of my improved dust-cap. Fig. 2 is a vertical transverse section of the same, and Fig. 3 is a horizontal section.

Similar letters of reference indicate corresponding parts.

$B^2$ denotes the metal cap or nut, adapted to be screwed or otherwise detachably secured on the end of a journal-box or axle-box or hub of a wheel, as the case may be, said cap being provided at its top with a circumferential flange, D, and with lugs or pins C, the former projecting horizontally or at right angles from the axis of the nut, while the lugs project vertically or parallel to the axis of the nut.

$A^2$ represents the rubber envelope, which is molded around the exterior of the metal cap, and thus closely fitted thereto. The before-described flange D and lugs C, projecting into the rubber envelope A, effectually prevent the latter from becoming detached from the metal nut or cap $B^2$. The rubber envelope $A^2$ projects beyond the base of the nut $B^2$, as shown at E, which projection comes first in contact with the end of the journal-box or hub in applying the cap $B^2$ thereto, and the compression of said projection E incident to the screwing up of the nut forms a perfectly air-tight packing which effectually excludes the dust from the journal or axle, and by resultant frictional hold of the extension E on the end of the journal-box or hub the nut is prevented from jarring loose. Furthermore, the base of the metal nut is deprived of its hold on the end of the journal-box to such an extent as to prevent its becoming bound or set, allowing it to be removed without the assistance of a wrench, when necessary, for oiling the journal or for repairs of same.

Having described my invention, what I claim as new, and desire to secure by Letters Patent, is—

The improved dust-cap for journal-boxes or axle-boxes, consisting of the metal nut or cap $B^2$, provided with the flange D and with lugs C, and the rubber or other envelope, $A^2$, embracing closely the exterior of said nut, and having the projection E at the base of same, all constructed and combined substantially as described and shown, for the purpose set forth.

THOMAS W. SQUIRES.

Witnesses:
ASHTON H. COLDHAM,
RICHARD G. MILLER.